March 19, 1940.  M. TIBBETTS  2,193,949
MOTOR VEHICLE
Filed Jan. 17, 1938  2 Sheets-Sheet 1
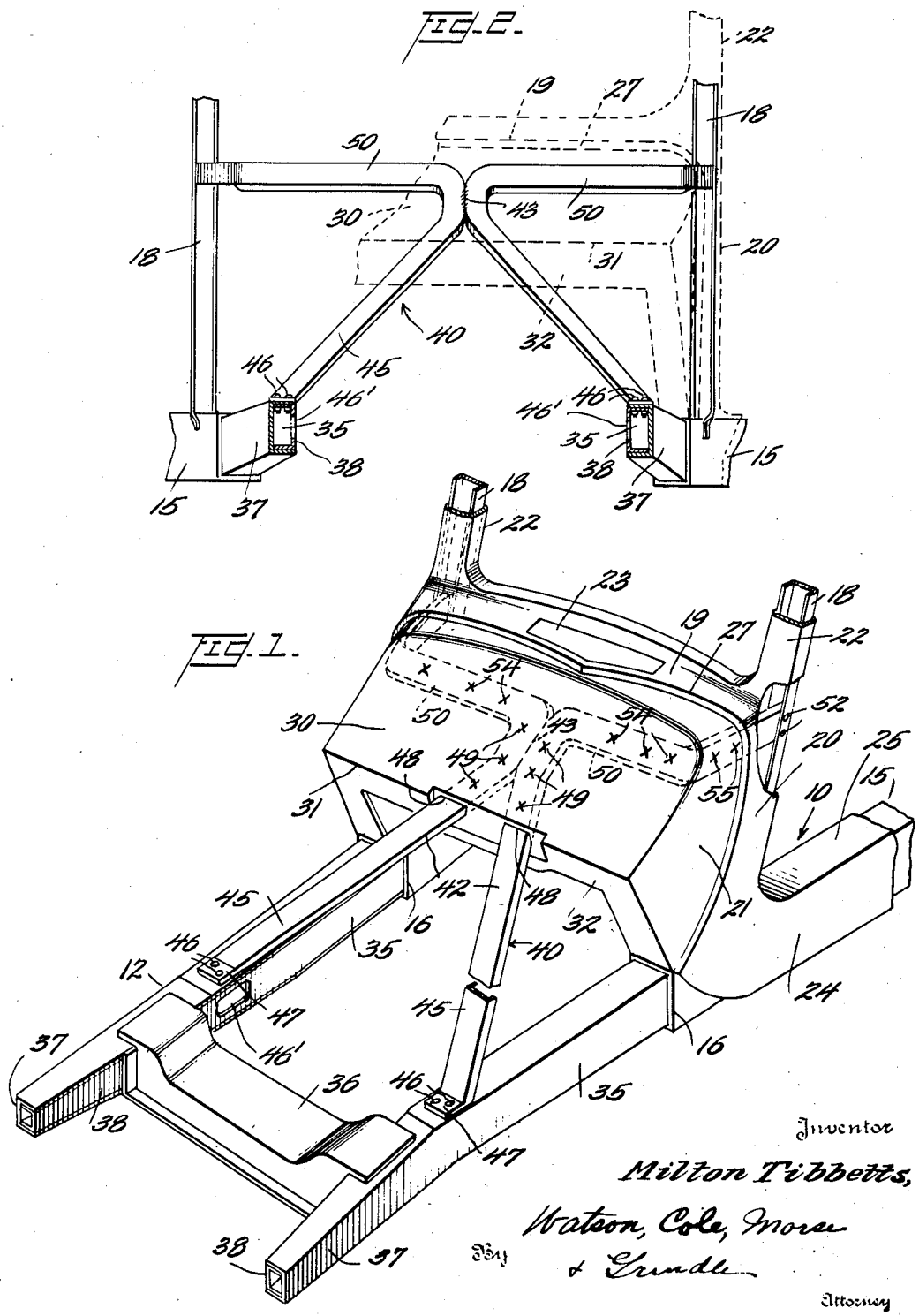
Inventor
Milton Tibbetts,
Watson, Cole, Morse
& Grindle
Attorney March 19, 1940.
M. TIBBETTS
2,193,949
MOTOR VEHICLE
Filed Jan. 17, 1938
2 Sheets-Sheet 2
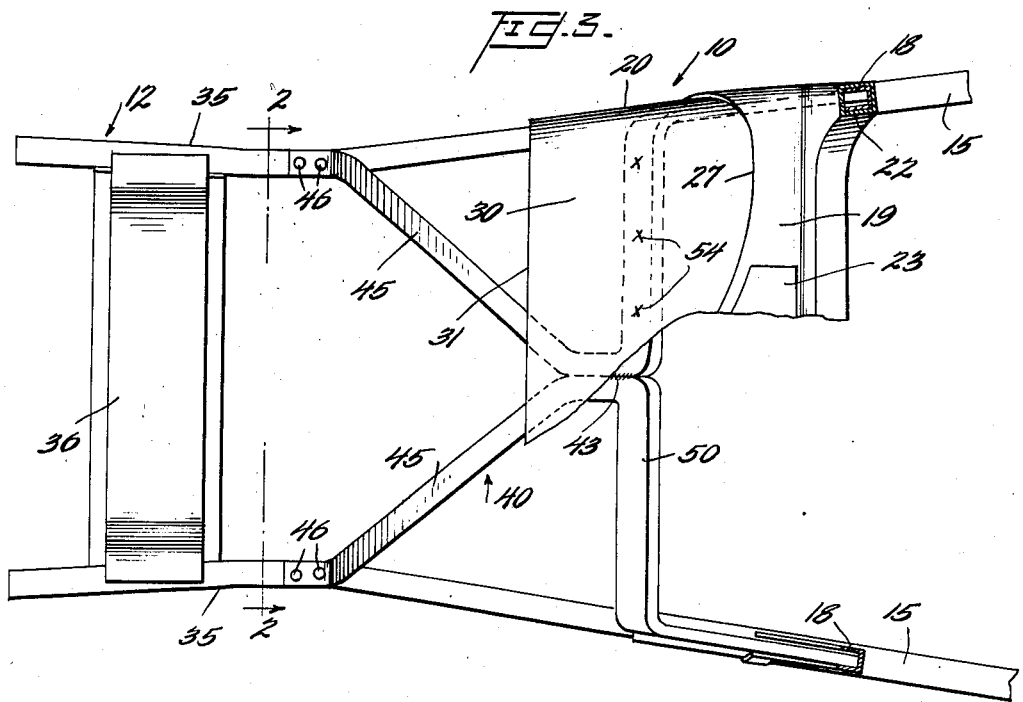
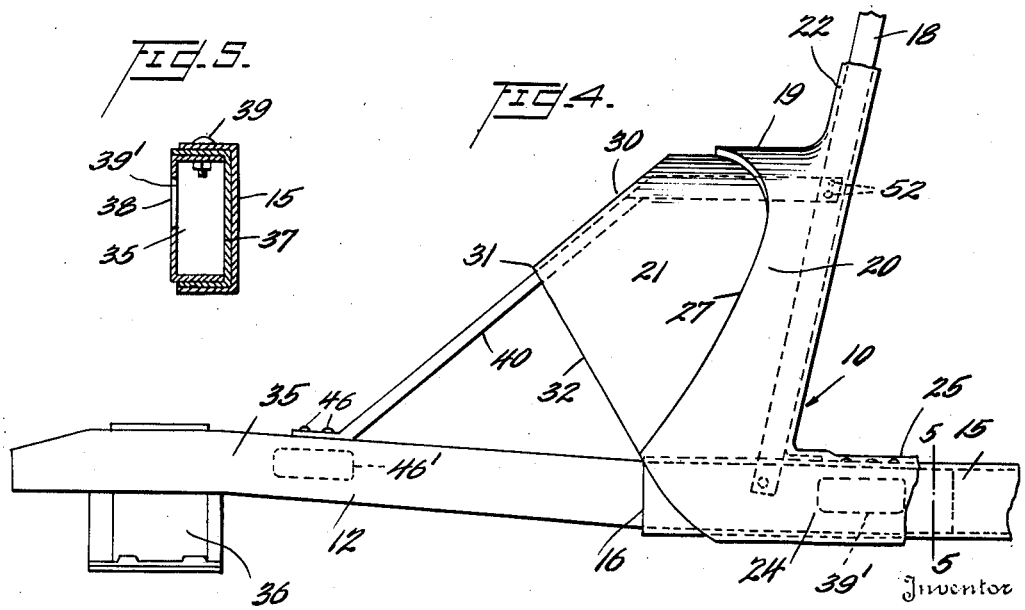
Inventor
Milton Tibbetts,
By Watson, Cole, Grindle
Attorney Patented Mar. 19, 1940

2,193,949

UNITED STATES PATENT OFFICE 2,193,949

MOTOR VEHICLE

Milton Tibbetts, Detroit, Mich., assignor to Packard Motor Car Company, Detroit, Mich., a corporation of Michigan Application January 17, 1938, Serial No. 185,461

10 Claims. (Cl. 296—28)

This invention relates to motor vehicles and more particularly to body constructions and the supporting and reinforcing frame structure thereof.

It is the general object of the invention to provide a novel and improved motor vehicle body construction which is characterized by increased sturdiness and resistance to the stresses to which it is subjected in use, as well as by the relative ease of manufacture and assembly thereof.

More particularly, it is an object of the invention to provide at the forward portion of the vehicle frame an improved bracing and reinforcing means which is adapted to provide increased resistance to both the torsional forces tending to twist the frame and the bending stresses set up therein by the weight of the body and load between the spaced points of support represented by the front and rear axles of the vehicle.

The present invention has particular utility and special advantages when embodied in a combined body and chassis assembly wherein the forward motor supporting and front axle carrying part of the chassis portion of the assembly is made as a separable unit, as for the purpose of convenience of manufacture, whereby the motor may be mounted on the forward unit in one assembly line, the body finished in another assembly line, and then the two units brought together and secured. This forward stub frame unit which carries the motor is provided with relatively short side members which may be either permanently or detachably secured to the side members or sills of the rearward body-chassis assembly; and the additional bracing and reinforcing features of the present invention effectively serve to more than offset any possible weakening of the vehicle frame which such two-part construction might entail.

In its preferred embodiment, the invention contemplates the provision of a generally forwardly and downwardly inclined brace member which extends from the cowl structure of the body to the stub frame to which it is detachably secured. The upper portion of the transverse sheet forming the forward panel of the cowl stamping slopes forwardly and downwardly to a point where the toeboard portion begins its rearward inclination. The novel brace member is adapted to underlie and reinforce the intermediate portion of this sheet and is provided with divergent arms which extend laterally outwardly to the side portions of the cowl, where they are directed rearwardly toward the front pillar or door post portions of the car body assembly to which they are permanently secured.

Preferably the brace member to which reference has been made is of a generally X-shaped configuration, being formed of a pair of channel elements rigidly joined together at their intermediate portions and diverging toward their ends to provide upper and lower spaced legs which are respectively connected to the pillar portions of the body and the side members of the stub frame. Thus it will be seen that there is provided a cross connecting member which, not only serves to brace the body and chassis framing assembly both transversely and longitudinally, but also reinforces the cowl structure of the completed body.

Other objects and features of novelty will become apparent from the following specification when read in connection with the accompanying drawings in which one embodiment of my invention is illustrated by way of example.

In the drawings:

Figure 1 is a view in perspective of the forward portion of a motor vehicle body and chassis assembly, certain portions thereof being removed for the sake of clearness and other concealed portions of important elements of the structure being shown in dotted lines;

Figure 2 is a fragmentary and somewhat diagrammatic view in transverse cross section taken on line 2—2 of Figure 3 of the front end construction illustrated in Figure 1;

Figure 3 is a similar fragmentary view of the front end construction in plan;

Figure 4 is a view in side elevation of the structure shown in Figure 3; and

Figure 5 is a view in transverse cross section taken on line 5—5 of Figure 4 and illustrating one form of connection between the stub frame and the main body frame of the vehicle.

Referring now in more detail to the accompanying drawings, it will be seen that the rear combined body and chassis assembly which forms a part of the exemplary embodiment of the invention is designated generally by the reference numeral 10, while the forward stub frame, which supports the motor (not shown) and carries the front axle and wheel suspension, is denoted by the numeral 12. The framing of the body unit 10 includes the two side members or sills 15 which terminate as indicated at 16 at a point beneath the cowling of the vehicle. Secured to and extending upwardly from the forward portion of the side members 15 are the front pillars or door posts 18 which preferably are formed of channel elements which open forwardly and serve to support the paneling of the forward portion of the body. These pillar members 18 as depicted in the drawings are of a simple plain shape and construction and are shown thus for exemplary purposes only as being illustrative of a wide variety of expedients which may be employed to reinforce the side portions of the front paneling of the car body assembly adjacent the forward jambs of the front door frames. This particular part of the body assembly may be conveniently termed the pillar portions thereof and this designation may be so used in certain of the claims. The front paneling or sheathing may be of any desired construction and will include the cowling 19, which comprises the rearward exposed portion 20 and the forward area 21 which is adapted to lie beneath the hood covers of the car. It will also include portions such as indicated at 22 which surround the windshield opening, the cowl ventilator 23, and the lower side portions 24, a portion of which comprises the covering for the door sill indicated at 25. The forward and rearward cowl portions 20 and 21 of generally inverted U-shaped configuration, are separated by the shoulder 27 which enables the hood covers (not shown) to lie flush with the outer exposed rearward cowl sheathing 20.

Suitably secured to or formed integrally with the cowl portion 21 is the forward transverse cowl sheet or dash 30 which slopes downwardly and forwardly, as clearly shown in Figure 4 of the drawings, to an intermediate point indicated at 31 where it joins the toeboard portions 32 of the body.

The forward stub chassis frame 12 comprises the side members 35 and the cross member or transom 36 which may serve to support the forward end of the motor. The side members 35 are preferably of box construction being formed of the outer inwardly facing channel member 37 and the enclosed outwardly facing channel element 38. The rear ends of the side members 35 are inserted within the side members or sills 15 of the main body assembly which are either of a similar box construction or are formed of single channel members. At any rate, there is provided a telescoping connection between the members 15 and the members 35 which may be made permanent as by welding or may be detachable, as suggested in Figure 5 of the drawings, by means of the bolts 39. Openings 39' may be provided in the web of the channel member 38 for enabling the connection to be effected. There has thus far been described a separable body and chassis assembly which, as has been suggested, may be knocked down for shipping purposes or separated in order to enable more convenient repair or inspection of the power plant of the vehicle.

In order to provide a more rigid front end construction for vehicles of this type or others of similar design, there is provided the novel bracing structure indicated generally by the reference numeral 40. As will be readily seen from an inspection of the several views in the drawings, this member is of a general X-shaped configuration and comprises two channel bars 42, the adjacent flanges of which are welded or otherwise rigidly and permanently secured together at their intermediate portions as indicated at 43. The member 40 is for the most part disposed in a downwardly and forwardly inclined position, and the diverging lower legs 45 are secured at their ends to the upper surfaces of the side members 35 of the stub frame 12 as by welding or by means of the removable fastening elements 46 which may, as shown, pass through the bent ends 47 of the base flanges of the channel members 45. Openings 46' may be provided in the box side members of the stub frame in order to permit the connection to be effected. The downwardly and forwardly diverging legs 45 of the bracing member 40 pass through the central portion of the toeboard sheet 32 as indicated at 48, and the intermediate intersecting portion of the member 40 is adapted to lie in contact with the undersurface of the upper transverse sheet or dash 30 and may be spot welded thereto as diagrammatically indicated at 49.

The upper diverging arms of the X-shaped bracing member 40 are designated 50 and diverge in opposite directions from the intermediate point of connection 43 beneath the sheet 30 until they reach the lines of intersection of the sheet 30 with the side portions of the cowling 19. The arms 50 are bent at this point to extend rearwardly in an approximately vertical plane so as to underlie the cowling sections 21 and 20 until they reach the pillars 18 to which they are rigidly secured as by means of the fastening elements 52, which pass through the arms 50 and the outer flanges of the pillar 18. The arms 50 are preferably spot welded to the undersurface of the transverse forward cowl sheet or dash 30 as indicated at 54 and to the lateral cowl sheets 21 as indicated at 55.

From this description, it will be understood that the bracing member 40 is a permanent part of the main body frame of the vehicle and provides a very effective cross bracing and reinforcing structure between this body assembly and the stub chassis frame which is attached to the forward end thereof. Not only does the brace member 40 provide the necessary rigidity between the pillars 18, which exemplify the conventional vertically extending reinforced framing structure at this forward portion of the body, but the entire cowl structure is effectively supported and reinforced without the necessity of employing the numerous brackets and bracing elements which have heretofore been found necessary.

It is understood that numerous changes and modifications may be made in the embodiment illustrated and described herein, and the basic improvements characterizing the present invention may be applied to other known vehicle constructions, without departing from the scope of the present invention as set forth in the subjoined claims.

Having thus described the invention, what is claimed as new and desired to be secured by Letters Patent is:

1. In a motor vehicle, in combination, a main body assembly which terminates forwardly at a point adjacent the cowling structure thereof, said cowling structure including a front sheet, a forwardly disposed stub frame secured to the lower part of the forward end of said body assembly, a brace having one end connected to the upper portions of each side of the forward end of the body assembly and extending forwardly to points on each side of said stub frame which are spaced forwardly from said body assembly and to which the forward end of the brace is connected, and an intermediate portion of said brace extending along said front sheet in contact therewith and connected thereto and serving to reinforce and brace said front sheet.

2. In a motor vehicle, a main body assembly which terminates forwardly adjacent the cowling thereof, said assembly comprising a front panel construction including a cowl of a generally inverted U-shaped configuration having side and top sheet portions and a front sheet sloping downwardly and forwardly from said top sheet portion and connecting the upper parts of said side sheet portions, a forward motor supporting stub frame, means for securing said stub frame to the forward end of said main body assembly, and a unitary bracing member extending from a point on said stub frame upwardly and rearwardly therefrom and underlying said front sheet and said side sheet portions of said cowl so as to reinforce and interbrace the same.

3. In a motor vehicle, a body assembly including cowling having a transversely disposed front sheet, a pair of forwardly projecting side frame members, a brace member disposed along the rear side of said front sheet and extending transversely from end to end thereof, a portion of said brace member also extending forwardly from a central point on said sheet to said projecting side frame members.

4. In a motor vehicle, a body assembly including a cowl of the conventional inverted U-shaped contour and provided with a forwardly and downwardly inclined front sheet, a pair of forwardly projecting side frame members, a brace member disposed along the inner sides of both the front sheet and the side portions of said cowl to reinforce the same, a portion of said brace member also extending forwardly from said front sheet to said projecting side frame members.

5. In a motor vehicle, a body assembly comprising longitudinally extending side sill members, forward pillar portions extending upwardly from said side sill members on opposite sides of the assembly, a cowl disposed forwardly of said pillar portions, a unitary brace member having one end secured to one of said pillar portions at a point above said sill members and extending beneath and secured to said cowl so as to reinforce the same, said brace member extending downwardly and forwardly from said cowl, the forward end thereof being secured to one of said side members at a point spaced forwardly from said cowl.

6. In a motor vehicle, a body assembly comprising longitudinally extending side members, forward pillar portions extending upwardly from said side members upon opposite sides of the structure, cowling of a generally inverted U-shaped contour forming a part of said body assembly forwardly of said pillar portions, said cowling including a front sheet extending transversely of the upper portion thereof, a unitary substantially X-shaped cross brace member having its central intersection portion disposed in contact with said sheet, a pair of divergent legs on said member projecting forwardly of said cowling and being secured to the forward portions of said side members and the rearwardly extending legs being secured respectively to the pillar portions of the body assembly.

7. In a motor vehicle, a body assembly comprising longitudinally extending side members, forward pillar portions extending upwardly from said side members upon opposite sides of the structure, cowling of a generally inverted U-shaped contour forming a part of said body assembly forwardly of said pillar portions, said cowling including a front sheet sloping downwardly and forwardly from the upper portion thereof, a unitary substantially X-shaped cross brace member having its central intersection portion disposed against the inner surface of said sheet, the downwardly and forwardly divergent legs of said member being secured to the forward portions of said side members and the rearwardly divergent legs being disposed against the inner surfaces of the sloping front sheet and of the side portions of said cowl and secured thereto, and being secured respectively to said pillar portions of the body assembly.

8. In a motor vehicle, a body assembly comprising longitudinally extending side frame members, forward pillar portions extending upwardly from said side frame members upon opposite sides of the assembly, a downwardly and forwardly inclined substantially X-shaped cross brace member having its rearwardly extending legs secured to the body assembly adjacent its respective pillar portions, and its forwardly and downwardly directed legs secured to forward portions of said side frame members, said bracing member being formed of a pair of angularly bent channel shapes rigidly secured together at their intermediate portion.

9. In a motor vehicle, a main body assembly including side sill members and forward pillar portions extending upwardly from said side sill members upon opposite sides thereof, a cowl of the conventional inverted U-shaped contour, a forwardly disposed stub frame having rearwardly extending side members secured to said side sill members, and a cross brace member secured to the pillar portions of said body assembly at points spaced above said sill members, and extending forwardly therefrom along the inner surface of the side portions of said cowl to reinforce the same, and thence to a point on said stub frame spaced forwardly from said body and chassis frame, and means for securing said brace member to said stub frame at said last named point.

10. In a motor vehicle, a main body and chassis frame including side sill members and forward pillar members secured to and extending upwardly from said side sill members upon opposite sides thereof, a cowl stamping secured to the frame structure forwardly of said pillar members and including a transverse front sheet, a forwardly disposed stub frame having rearwardly extending side members detachably secured to said side sill members, and a brace member permanently secured directly to said pillars, said front sheet, and the side portions of said cowl and extending forwardly and downwardly from said front sheet toward said stub frame, and means for detachably securing said brace member to said stub frame at a point spaced forwardly from said dash sheet.

MILTON TIBBETTS.

DISCLAIMER 2,193,949.—*Milton Tibbetts*, Detroit, Mich. MOTOR VEHICLE. Patent dated March 19, 1940. Disclaimer filed January 22, 1941, by the assignee, *Packard Motor Car Company*.

Hereby enters this disclaimer to claims 1, 2, 3, 4, 5, and 9 in said Letters Patent.
[*Official Gazette February 25, 1941.*]